(12) United States Patent
Ray et al.

(10) Patent No.: US 11,657,543 B2
(45) Date of Patent: May 23, 2023

(54) TRISOUP SYNTAX SIGNALING FOR GEOMETRY-BASED POINT CLOUD COMPRESSION

(71) Applicant: QUALCOMM Incorporated, San Diego, CA (US)

(72) Inventors: Bappaditya Ray, San Diego, CA (US); Adarsh Krishnan Ramasubramonian, Irvine, CA (US); Louis Joseph Kerofsky, San Diego, CA (US); Geert Van der Auwera, Del Mar, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 52 days.

(21) Appl. No.: 17/224,674

(22) Filed: Apr. 7, 2021

(65) Prior Publication Data

US 2021/0319595 A1 Oct. 14, 2021

Related U.S. Application Data

(60) Provisional application No. 63/007,274, filed on Apr. 8, 2020.

(51) Int. Cl.
*G06T 9/20* (2006.01)
(52) U.S. Cl.
CPC ..................... *G06T 9/20* (2013.01)
(58) Field of Classification Search
CPC ........................................ G06T 9/20

USPC .......................................................... 382/239
See application file for complete search history.

(56) References Cited

U.S. PATENT DOCUMENTS

2018/0189982 A1\* 7/2018 Laroche .................. G06T 9/40
2021/0407142 A1\* 12/2021 Hur ........................ G06T 9/40
2022/0159261 A1\* 5/2022 Oh ..................... H04N 21/6379

OTHER PUBLICATIONS

International Search Report and Written Opinion—PCT/US2021/026407—ISA/EPO—dated Jul. 2, 2021.
Mammon K., et al., "G-PCC Codec Description", 125, MPEG Meeting, Jan. 14, 2019-Jan. 18, 2019, Marrakech, (Motion Picture Expert Group or ISO/IECJTC1/SC29/WG11), No. N18189, Feb. 22, 2019 (Feb. 22, 2019), pp. 1-39, XP030212734, Retrieved from the Internet: URL: http://phenix.int-evry.fr/mpeg/doc_end_user/documents/125_Marrakech/wg11/w18189.zip.w18189.docx. [retrieved on Feb. 22, 2019].

(Continued)

*Primary Examiner* — Allen C Wong
(74) *Attorney, Agent, or Firm* — Shumaker & Sieffert

(57) ABSTRACT

An example device for processing point cloud data includes a memory configured to store the point cloud data and one or more processors implemented in circuitry and coupled to the memory. The one or more processors are configured to count a number of edges of a cube of point cloud data comprising a vertex. The one or more processors are configured to set a variable based on a total of the counting. The one or more processors are also configured to process the point cloud data based on the variable.

18 Claims, 5 Drawing Sheets

(56) References Cited

OTHER PUBLICATIONS

Ray (Qualcomm) B., et al., "[G-PCC] [new]On Trisoup-Syntax Signaling Cleanup", 130. MPEG Meeting, Apr. 20, 2020-Apr. 24, 2020, Alpbach, (Motion Picture Expert Group or ISO/IEC JTC1/SC29/WG11), No. M53635, Apr. 15, 2020 (Apr. 15, 2020), XP030287287, Retrieved from the Internet: URL: http://phenix.int-evry.fr/mpeg/doc_end_user/documents/130 Alpbach/wg11/m53635-v1-m53635.zip. m53635/m53635-trisoup-sig-v1.docx [retrieved on Apr. 15, 2020].

Ray (Qualcomm) B., et al., "[G-PCC] High Level Syntax Cleanup of G-PCC", 129, MPEG Meeting, Jan. 13, 2020-Jan. 17, 2020, Brussels, (Motion Picture Expert Group or ISO/IEC JTC1/SC29/WG11), No. m52342, Jan. 14, 2020 (Jan. 14, 2020), XP030224976, Retrieved from the Internet: URL: http://phenix.int-evry.fr/mpeg/doc_end_user/documents/129_Brussels/wg11/m52342-v2-m52342_r1.zip m52342/m52342_r1.docx [retrieved on Jan. 14, 2020].

"Text of ISO/IEC CD 23090-9 Geometry-Based Point Cloud Compression", 126. MPEG Meeting, Mar. 25, 2019-Mar. 29, 2019, Geneva, (Motion Picture Expert Group or ISO/IEC JTC1/SC29/WG11), No. n18478, Jul. 2, 2019 (Jul. 2, 2019), XP030222353, 102 Pages, Retrieved from the Internet: URL:http://phenix.int-evry.fr/mpeg/doc_end_user/documents/126_Geneva/wg11/w18478.zip w18478 GPCC_CD.docx [retrieved on Jul. 2, 2019].

ITU-T H.265: "Series H: Audiovisual and Multimedia Systems Infrastructure of Audiovisual Services—Coding of Moving Video High Efficiency Video Coding," The International Telecommunication Union, Jun. 2019, 696 Pages.

\* cited by examiner

TRISOUP SYNTAX SIGNALING FOR GEOMETRY-BASED POINT CLOUD COMPRESSION

This application claims the benefit of U.S. Provisional Patent Application 63/007,274, filed Apr. 8, 2020, the entire content of which is incorporated by reference.

TECHNICAL FIELD

This disclosure relates to point cloud encoding and decoding.

SUMMARY

In general, this disclosure describes techniques for trisoup signaling for geometry-based point cloud compression (G-PCC). Trisoup is a geometry coding option in which a G-PCC encoder may represent an object's surface captured in the point cloud as a series of triangle meshes. In some examples, the techniques of this disclosure may also be applicable to G-PCC and other future standards. For example, rather than signal a trisoup syntax element that is determinable by a G-PCC decoder based on other information, a G-PCC encoder may refrain from signaling the syntax element and the G-PCC decoder may determine the value of the syntax element based on the other information. In this manner, the techniques of this disclosure may reduce the number of bits used to encode point cloud data in trisoup mode and reduce the bandwidth of transmitted encoded point cloud data.

A three-dimensional block or cube has 12 edges (e.g., four edges on a front face, four edges on a back face, and four edges between the front face and the back face). In trisoup mode, geometry may be represented within each cube as a surface that intersects each edge of the cube at most once. Since there are 12 edges of a cube, there can be at most 12 such intersections within a cube. Each such intersection is called a vertex.

In one example, this disclosure describes a method including counting a number of edges of a cube of the point cloud data comprising a vertex, setting a variable based on a total of the counting, and processing the point cloud data based on the variable.

In another example, this disclosure describes a device including a memory configured to store the point cloud data and one or more processors implemented in circuitry and coupled to the memory, the one or more processors being configured to: count a number of edges of a cube of the point cloud data comprising a vertex; set a variable based on a total of the counting; and process the point cloud data based on the variable.

In yet another example, this disclosure describes a computer-readable storage medium storing instructions, which, when executed, cause one or more processors to: count a number of edges of a cube of point cloud data comprising a vertex; set a variable based on a total of the counting; and process point cloud data based on the variable.

In yet another example, this disclosure describes a device including means for counting a number of edges of a cube of the point cloud data comprising a vertex, means for setting a variable based on a total of the counting, and means for processing the point cloud data based on the variable.

The details of one or more examples are set forth in the accompanying drawings and the description below. Other features, objects, and advantages will be apparent from the description, drawings, and claims.

DETAILED DESCRIPTION

According to some draft standards, such as the draft geometry-based point cloud compression (G-PCC) standard as of Apr. 7, 2020, syntax elements may be signaled by a G-PCC encoder to a G-PCC decoder so that the decoder may determine how to decode encoded data. According to the draft G-PCC standard, a G-PCC encoder may signal a syntax element associated with trisoup mode even though a G-PCC decoder may be able to determine the information conveyed by that syntax element from other information available at the G-PCC decoder. Trisoup coding is a geometry coding option in which a G-PCC encoder may represent an object's surface captured in the point cloud as a series of triangle meshes. As such, the number of bits used to encode point cloud data may be higher than necessary and therefore, be an inefficient use of bandwidth.

According to the techniques of this disclosure, a G-PCC encoder may not signal such a syntax element and G-PCC decoder may determine the information otherwise conveyed by the syntax element by counting a number of other syntax elements having a specified value. In this manner, the number of bits used to encode point cloud data in trisoup mode may be reduced and the bandwidth of transmitted encoded point cloud data may similarly be reduced.

Figure 1:
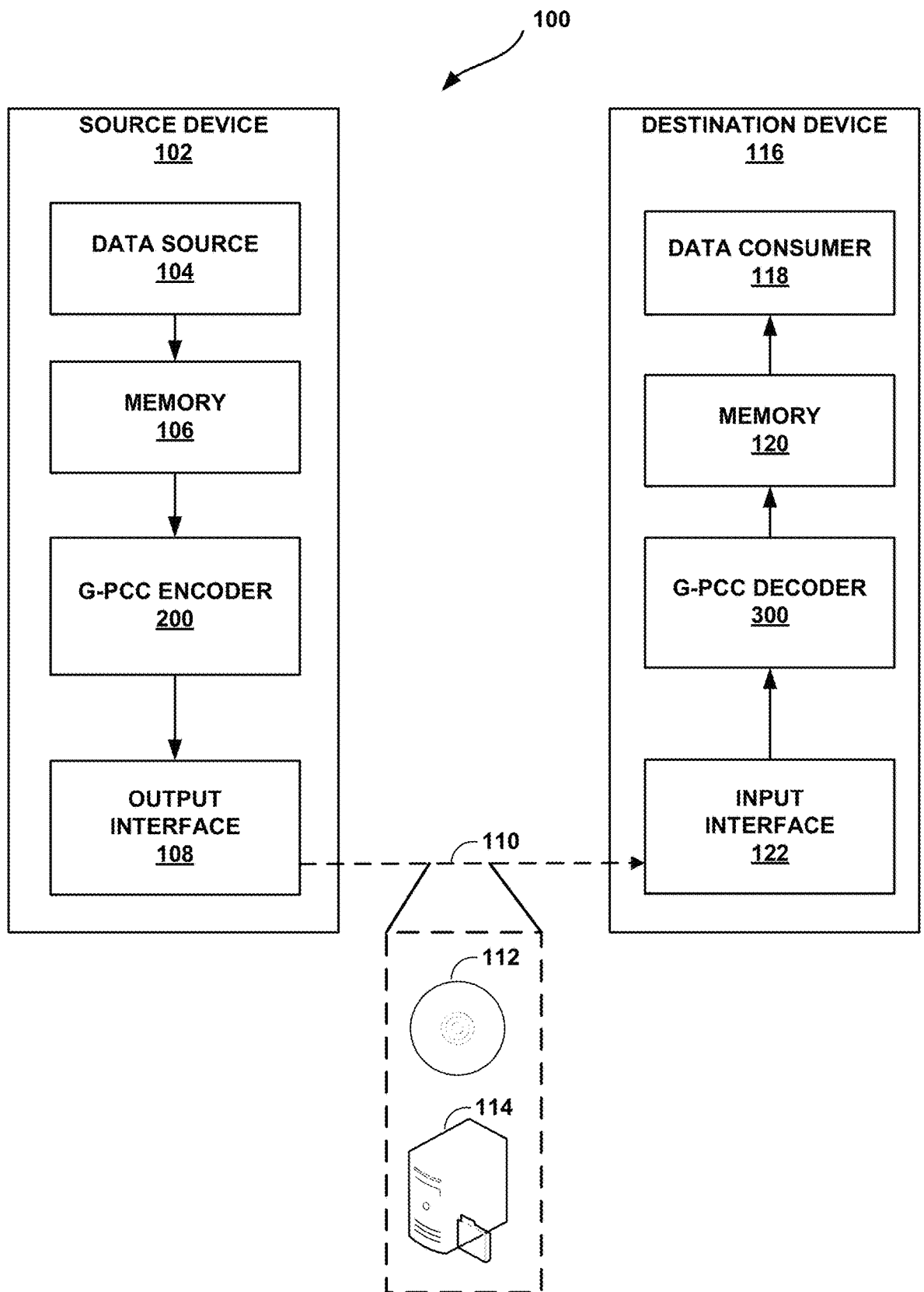
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to trisoup signaling. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform of the techniques of this disclosure related to trisoup signaling. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry, i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020, and a description of the codec is available in G-PCC Codec Description v6, ISO/IEC JTC1/SC29/WG11 w19091, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
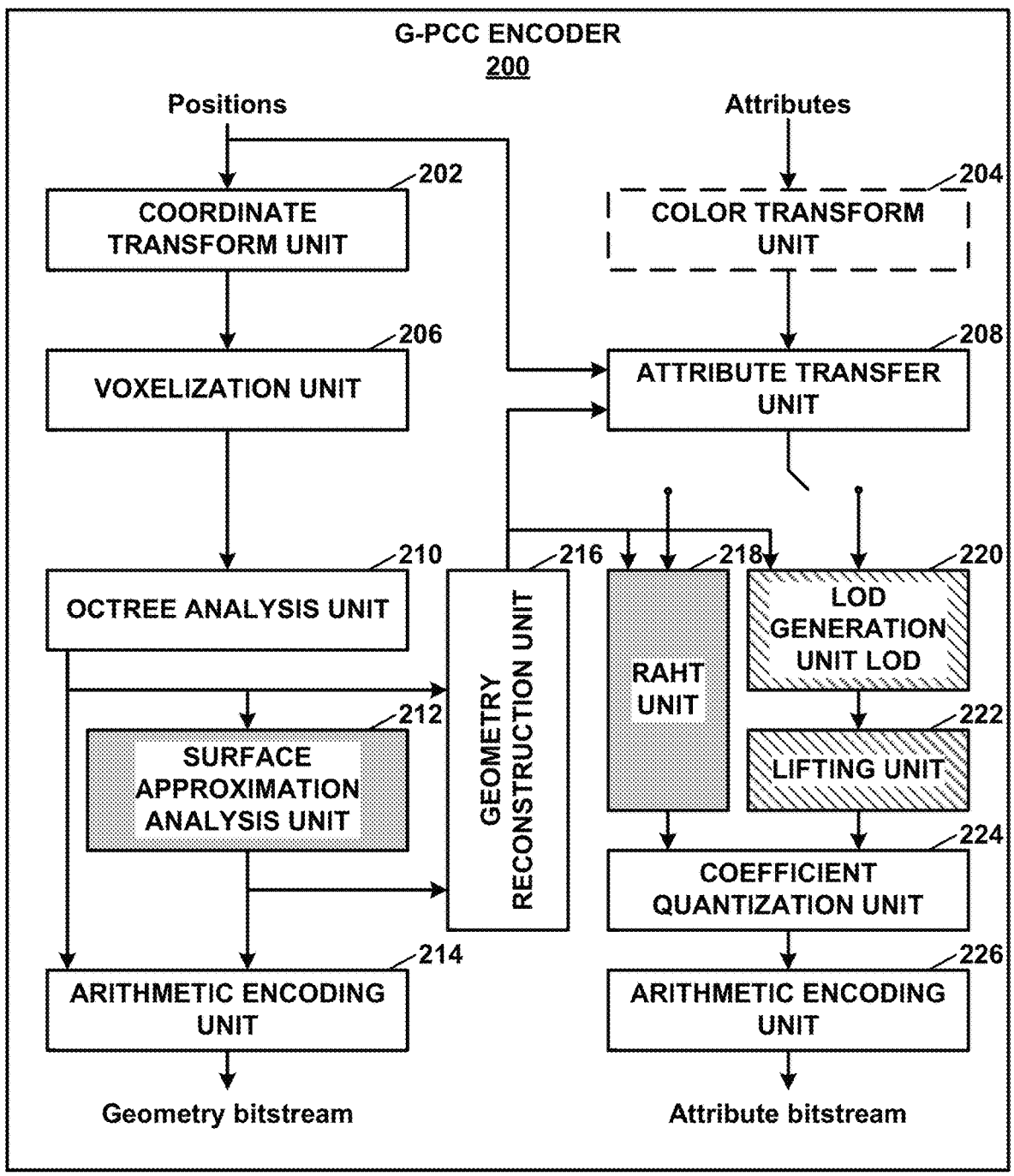
FIG. 2 is a block diagram illustrating an example Geometry-based Point Cloud Compression (G-PCC) encoder.
Figure 3:
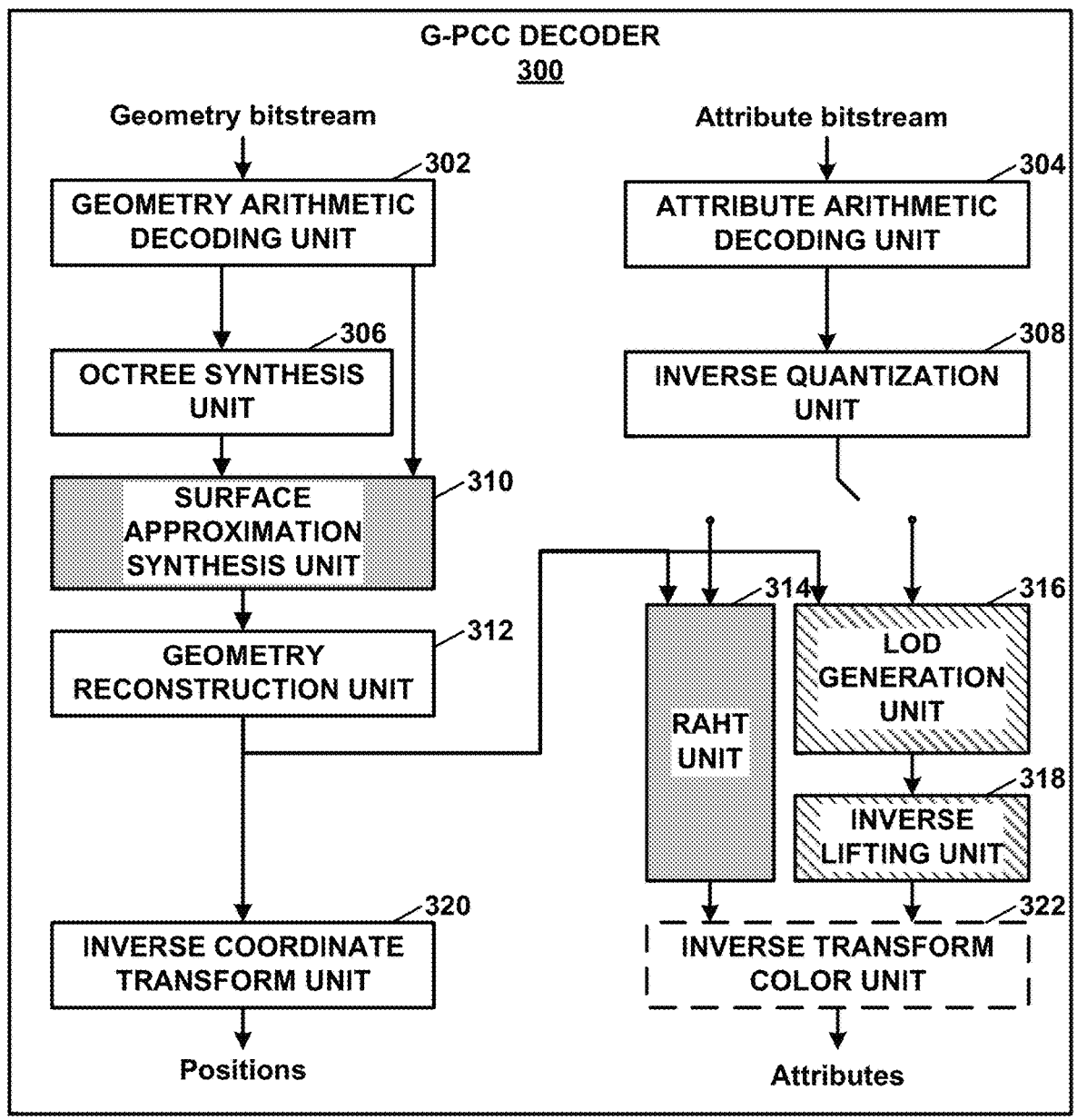
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the trisoup geometry codec, while the Category 3 geometry codec is known as the octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points.

In some examples, surface approximation analysis unit 212 may count a number of edges of a cube of the point cloud data comprising a vertex and set a variable based on a total of the counting. In some examples, surface approximation analysis unit 212 may also determine a difference based at least in part on the variable. The difference may also be referred to as a delta. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of G-PCC decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree. In some examples, surface approximation synthesis unit 310 may count a number of edges of a cube of the point cloud data comprising a vertex and set a variable based on a total of the counting. In some examples, surface approximation synthesis unit 310 may determine a difference or delta based on the variable and a syntax element received in a bitstream from G-PCC encoder 200.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of G-PCC encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Trisoup coding is now discussed in further detail. Trisoup coding is a geometry coding option in which G-PCC encoder 200 may represent an object's surface captured in the point cloud as a series of triangle meshes. Trisoup coding is typically useful for dense surface point clouds. The decoder, e.g., G-PCC decoder 300, may reconstruct a point cloud from the mesh surface with a specified voxel granularity.

If trisoup geometry coding is used, the parameter trisoup_node_size may be used to define the size of the triangle nodes in units of voxels. The octree encoding, e.g., performed by G-PCC encoder 200, and decoding, e.g., performed by G-PCC decoder 300, stops at leaf level 1, in which case the leaf nodes of the octree represent cubes of width $W=2^{\wedge}(max\_node\_size\_log\ 2,-1)$, and the octree is said to be pruned. In this case, Inferred Direct Coding Mode is not allowed. Inferred Direct Coding Mode is a coding mode that facilitates the coding of the position directly instead of further octree recursive splits.

If the parameter trisoup_node_size>0, then the cubes are 2×2×2 or larger, and it may be desirable to represent the collection of voxels within the cube by some model. Geometry is represented within each cube as a surface that intersects each edge of the cube at most once. Since there are 12 edges of a cube, there can be at most 12 such intersections within a cube. Each such intersection is called a vertex. In some examples, G-PCC encoder 200 or G-PCC decoder 300 may detect a vertex along an edge if and only if there is at least one occupied voxel adjacent to the edge among all cubes that share the edge. The position of a detected vertex along an edge is the average position along the edge of all such voxels adjacent to the edge among all cubes that share the edge.

Vertices, nominally being intersections of a surface with edges of a cube, are shared across neighboring cubes, not only guaranteeing continuity across cubes of the reconstructed surface, but also reducing the number of bits required to code the collection of vertices. The set of vertices may be coded, e.g., by G-PCC encoder 200 or G-PCC decoder 300, in two steps. For example, in a first step, G-PCC encoder 200 may be configured to compute the set of all the unique edges (or segments) of occupied cubes. G-PCC encoder 200 may be configured to use bit vector (or segment indicator) to determine which segments contain a vertex and which do not. In a second step, for each segment that contains a vertex, G-PCC encoder 200 may be configured to apply a uniformly scalar quantizer to the position of the vertex along the segment to obtain a small number of levels. This number is typically equal to the cube size if the geometric spatial resolution is desired to approximate the voxel resolution, but this number could be any number of levels. Arithmetic encoding unit 214 may entropy encode the segment indicators and the vertex positions. The geometry bitstream thus becomes a compound bitstream comprising octree, segment indicator, and vertex position bitstreams. Geometry arithmetic decoding unit 302 may decode the compound bitstream.

Figure 4:
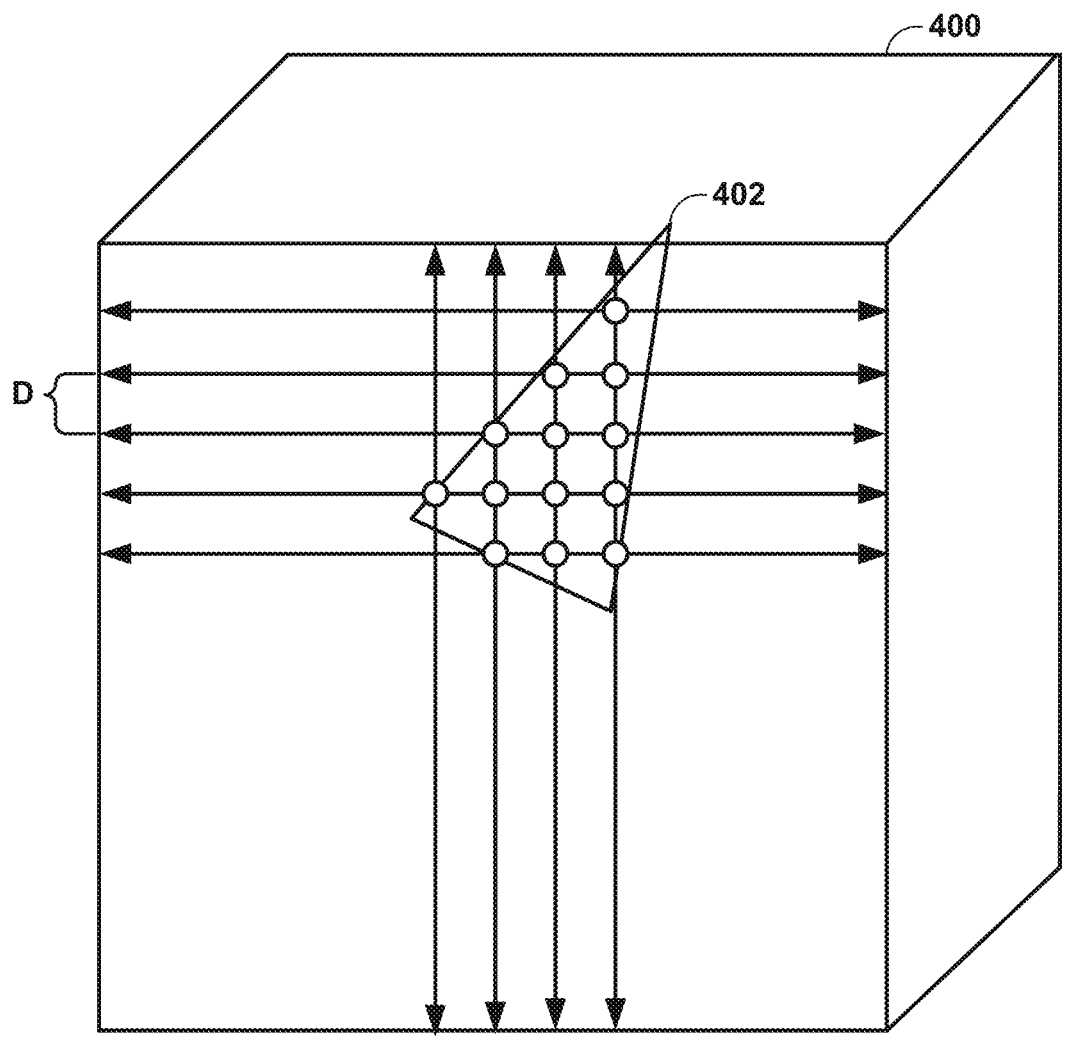
FIG. 4 is a conceptual diagram illustrating an example trisoup representation.

FIG. 4. is a conceptual diagram illustrating an example trisoup representation. In the example of FIG. 4, cube 400 is depicted. A regular grid with a distance between lines of d is also depicted. Intersection points of triangle 402 with the grid lines are circled. These circled points represent the points that would be part of the reconstructed point cloud.

Trisoup syntax and semantics within the G-PCC draft standard are shown below:

|  | Descriptor |
|---|---|
| geometry_trisoup_data( ) {  |  |
|     trisoup_sampling_value_minus1 | ae(v) |
|     num_unique_segments_minus1 | ae(v) |
|     for( i = 0; i <= num_unique_segments_minus1; i++ ) |  |
|         segment_indicator[ i ] | ae(v) |
|     num_vertices_minus1 | ae(v) |
|     for( i = 0; i <= num_vertices_minus1; i++ ) |  |
|         vertex_position[ i ] | ae(v) |
| } |  | trisoup_sampling_value_minus1 plus 1 specifies the step size for the point sampling on the triangle surface in the trisoup decoding process specified in 8.2.3.3 num_unique_segments_minus1 plus 1 specifies the number of segment indicators.

segment_indicator[i] indicates for a unique edge whether the edge intersects the surface and hence contains a vertex (1) or not (0).

num_vertices_minus1 plus 1 specifies the number of vertices.

vertex_position[i] indicates the position of the vertex along the edge. The value of vertex_position[i] shall be in the range of 0 to (1<<log 2_trisoup_node_size)−1, inclusive.

According to the G-PCC draft syntax, syntax elements indicative of both the number of unique edges or segments (e.g., num_unique_segments_minus1) and the number of vertices (e.g., num_vertices_minus1) are signaled. For example, G-PCC encoder 200 may signal both num_unique_segments_minus1 and num_vertices_minus1. However, for each unique edge, G-PCC encoder 200 may signal whether the edge contains a vertex (e.g., the intersection point of trisoup geometry and the edge) or not (e.g., no such intersection) as the segment_indicator. A segment_indicator with a value of 1, indicates that edge contains vertex, and a segment_indicator with a value of 0 indicates that edge does not contain a vertex. Therefore, G-PCC decoder 300 may determine num_vertices_minus1 from segment indicator (e.g., segment_indicator) information. Thus, the signaling for the trisoup mode can be improved to remove syntax elements providing information that is readily determinable by G-PCC decoder 300. This may reduce signaling overhead.

Additionally, num_unique_segments_minus1 is coded with an Exponential-Golomb code with order 0, e.g., EG(0). However, a typical point cloud may have around 105-106 unique edges; thus EG(0) coding may not be optimal for coding such large numbers. Also, the number of unique edges increases as trisoup node size decreases and the number of cubes increases.

Signaling of num_vertices_minus1 is now discussed. In some examples, according to the techniques of this disclosure, G-PCC decoder 300 may count the number of edges for which the segment_indicator[ ] is 1.

```
count = 0 ;
    for( i = 0; i <= num_unique_segments_minus1; i++ ){
    if (segment_indicator[ i ] = = 1)
        count ++ ;
}
```

Then, G-PCC decoder 300 may set the variable count_minus1 to (count−1). In one example, count_minus1 is used as the value of num_vertices_minus1, i.e., num_vertices_minus1=count_minus1. Thus num_vertices_minus1 is not signaled by G-PCC encoder 200 and is instead derived by G-PCC decoder 300 based on the value of count_minus1. For example, G-PCC decoder 300 may determine that the value of num_vertices_minus1 from count_minus1. A revision to the draft G-PCC standard to reflect this technique is shown below. The beginning of deletions are marked <DELETE> and the end of deletions are marked </DELETE>

|  | Descriptor |
|---|---|
| geometry_trisoup_data( ) { |  |
|     trisoup_sampling_value_minus1 | ae(v) |
|     num_unique_segments_minus1 | ae(v) |
|     for( i = 0; i <= num_unique_segments_minus1; i++ ) |  |
|         segment_indicator[ i ] | ae(v) |
| <DELETE> num_vertices_minus1</DELETE> | <DELETE>ae(v)</DELETE> |
|     for( i = 0; i <= num_vertices_minus1; i++ ) |  |
|         vertex_position[ i ] | ae(v) |
| } |  |

In another example, the value of the variable count_minus1 may be used as a predictor for the value of the variable num_vertices_minus1. The variable count_minus1 may also be used to determine a difference or delta, e.g., num_vertices_delta=num_vertices_minus1−count_minus1. G-PCC encoder 200 may signal num_vertices_delta instead of signaling the variable num_vertices_minus1. num_vertices_delta can be coded with EG(k) (k can be predetermined or signaled, e.g., by G-PCC encoder 200) or truncated unary binarization. A revision to the draft G-PCC standard to reflect this example is shown below. The beginning of changes are marked <CHANGE> and the end of changes are marked </CHANGE>.

|  | Descriptor |
|---|---|
| geometry_trisoup_data( ) { |  |
|     trisoup_sampling_value_minus1 | ae(v) |
|     num_unique_segments_minus1 | ae(v) |
|     for( i = 0; i <= num_unique_segments_minus1; i++ ) |  |

-continued

| | Descriptor |
|---|---|
| segment_indicator[ i ] | ae(v) |
| <CHANGE>num_vertices_delta | <CHANGE>ae(v)</CHANGE> |
| num_vertices_minus1 = num_vertices_delta + count_minus1 </CHANGE> | |
| for( i = 0; i <= num_vertices_minus1; i++ ) | |
| vertex_position[ i ] | ae(v) |
| } | |

Signaling of num_unique_segments_minus1 is now discussed. In some examples, instead of EG(0) binarization, EG(k) binarization may be used for the coding of num_unique_segments_minus1. For example, EG(k) is the $k^{th}$ order exponential Golomb code and EG(0) is the $0^{th}$ order exponential Golomb code. The number of unique edges roughly scales up by a factor of 4 when log 2_trisoup_node_size (=log 2(trisoup_node_size)) decreases by 1. Accordingly, the value of k may be incremented by 2 to balance a scale factor of 4. Accordingly, k is defined as $$k = p - (\log 2\_trisoup\_node\_size << 1)$$

A value of p=22 may provide good performance over a diverse set of sequences. However, a different value of p may be used and be either predetermined at G-PCC encoder 200 and G-PCC decoder 300, inferred by G-PCC decoder 300 or signaled by G-PCC encoder 200. Note that the determination of k does not need any additional signaling, as it is computed from p and log 2_trisoup_node_size. Provided p is predetermined or inferred, no signaling is needed for k or p.

Figure 5:
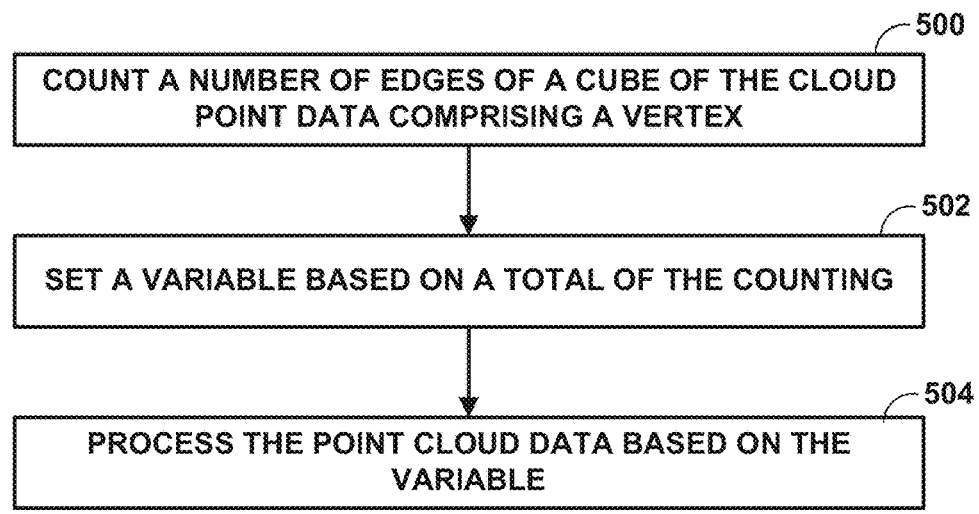
FIG. 5 is a flowchart illustrating an example technique for processing a point cloud according to the present disclosure.

FIG. 5 is a flowchart illustrating an example technique for processing a point cloud according to the present disclosure. G-PCC decoder 300 may count a number of edges of a cube of the cloud point data comprising a vertex (500). For example, G-PCC decoder 300 may count a number of edges for which a value of a respective syntax element indicates the respective edge includes a vertex. For example, G-PCC decoder 300 may count a number of edges for which a value of a respective segment_indicator[ ] is equal to 1. For example, a segment-indicator[ ] having a value equal to 1 for a given edge may be indicative of the given edge including a vertex.

G-PCC decoder 300 may set a variable based on a total of the counting (502). For example, G-PCC decoder 300 may set a variable, such a count_minus 1, to be equal the total of the counting minus 1. G-PCC decoder 300 may process the point cloud data based on the variable (504). For example, G-PCC decoder 300 may process the point cloud using count_minus 1.

In some examples, G-PCC decoder may determine a difference based on the variable and a syntax element and process the point cloud based on the difference. In some examples, a value of the syntax element is indicative of a number of vertices in the cube minus 1 and the difference equals the value of the syntax element minus the total of the counting minus 1. For example, the syntax element may be num_vertices_minus1 and the difference may equal num_vertices_minus1 minus the total of the counting minus 1. In some examples, the G-PCC encoder 200 or G-PCC decoder 300 may code the difference with Exponential-Golomb code. In some examples, G-PCC decoder 300 may include a display configured to display imagery based on the point cloud data.

By G-PCC encoder 200 not signaling a syntax element, such as num_vertices_minus1, and G-PCC decoder determining the information otherwise conveyed by the syntax element, the number of bits used to encode point cloud data in trisoup mode may be reduced and the bandwidth of transmitted encoded point cloud data may similarly be reduced. While the techniques of this disclosure may not impact geometry reconstruction quality (and also the attribute reconstruction quality) in the draft G-PCC codec design, the techniques of this disclosure may reduce the number of bits used to code the content.

Examples in the various aspects of this disclosure may be used individually or in any combination.

This disclosure includes the following non-limiting examples.

Clause 1A. A method of coding point cloud data, the method comprising: counting a number of edges or segments containing a vertex; setting a variable to a total of the counting minus 1; and coding the point cloud data based on the variable.

Clause 2A. The method of clause 1A, wherein the counting the number of edges or segments containing a vertex comprises counting a number of edges or segments for which a segment_indicator[ ] is 1.

Clause 3A. The method of clause 1A or clause 2A, wherein the variable is count_minus 1.

Clause 4A. The method of any combination of clauses 1A-3A, further comprising: determining a delta based on the variable and a syntax element; and coding the point cloud data based on the delta.

Clause 5A. The method of clause 4A, wherein the syntax element is num_vertices_minus1 and the delta equals num_vertices_minus1 minus the total of the counting minus 1.

Clause 6A. The method of clause 5A, further comprising coding the delta with Exp-Golomb code with order k (EG(k)).

Clause 7A. The method of clause 6A, wherein k is signaled in a bitstream.

Clause 8A. The method of clause 6A, wherein k is inferred.

Clause 9A. The method of clause 6A, wherein k is predetermined.

Clause 10A. The method of any combination of clauses 4A-5A, further comprising coding the delta with truncated unary binarization.

Clause 11A. The method of any combination of clauses 4A-10A, wherein the delta is signaled in a bitstream.

Clause 12A. A method of coding point cloud data, the method comprising: determining a syntax element; coding the syntax element using EG(k); and coding the point cloud data based on the syntax element, wherein k is a non-zero number.

Clause 13A. The method of clause 12A, wherein the syntax element is num_unique_segments_minus1 and k=p−(log 2_trisoup_node_size<<1), wherein p is a number.

Clause 14A. The method of clause 13A, wherein p is 22.

Clause 15A. The method of clause 13A or 14A, wherein p is predetermined.

Clause 16A. The method of any combination of clauses 13A-15A, wherein p is signaled in a bitstream.

Clause 17A. The method of any combination of clause 15A, wherein p is inferred.

Clause 18A. The method of any combination of clauses 1A-17A, further comprising generating the point cloud.

Clause 19A. The method of any combination of clauses 1A-17A, wherein coding comprised decoding.

Clause 20A. The method of any combination of clauses 1A-18A, wherein coding comprises encoding.

Clause 21A. A device for processing a point cloud, the device comprising one or more means for performing the method of any of clauses 1A-20A.

Clause 22A. The device of clause 21A, wherein the one or more means comprise one or more processors implemented in circuitry.

Clause 23A. The device of any of clauses 21A or 22A, further comprising a memory to store the data representing the point cloud.

Clause 24A. The device of any of clauses 21A-23A, wherein the device comprises a decoder.

Clause 25A. The device of any of clauses 21A-24A, wherein the device comprises an encoder.

Clause 26A. The device of any of clauses 21A-25A, further comprising a device to generate the point cloud.

Clause 27A. The device of any of clauses 21A-26A, further comprising a display to present imagery based on the point cloud.

Clause 28A. A computer-readable storage medium having stored thereon instructions that, when executed, cause one or more processors to perform the method of any of clauses 1A-20A.

Clause 1B. A method of processing point cloud data, the method comprising: counting a number of edges of a cube of the point cloud data comprising a vertex; setting a variable based on a total of the counting; and processing the point cloud data based on the variable.

Clause 2B. The method of clause 1B, wherein the variable comprises the total of the counting minus 1.

Clause 3B. The method of clause 1B or clause 2B, wherein counting the number of edges comprising a vertex comprises counting a number of edges for which a value of a respective syntax element indicates a respective edge includes a vertex.

Clause 4B. The method of clause 3B, wherein counting the number of edges for which the value of the respective syntax element indicates the respective edge includes a vertex comprises counting number of edges for which a value of a respective segment_indicator[ ] is equal to 1.

Clause 5B. The method of any combination of clauses 1B-4B, wherein the variable is count_minus 1.

Clause 6B. The method of any combination of clauses 1B-5B, further comprising: determining a difference based on the variable and a syntax element; and processing the point cloud data based on the difference.

Clause 7B. The method of clause 6B, wherein a value of the syntax element is indicative of a number of vertices in the cube minus 1 and the difference equals the value of the syntax element minus the total of the counting minus 1.

Clause 8B. The method of clause 6B or clause 7B, further comprising coding the difference with an Exponential-Golomb code.

Clause 9B. A device for processing point cloud data, the device comprising: a memory configured to store the point cloud data; and one or more processors implemented in circuitry and coupled to the memory, the one or more processors being configured to: count a number of edges of a cube of the point cloud data comprising a vertex; set a variable based on a total of the counting; and process the point cloud data based on the variable.

Clause 10B. The device of clause 9B, wherein the variable comprises the total of the counting minus 1.

Clause 11B. The device of clause 9B or clause 10B, wherein as part of counting the number of edges, the one or more processors are configured to count a number of edges for which a value of a respective syntax element indicates a respective edge includes a vertex.

Clause 12B. The device of clause 11B, wherein as part of counting the number of edges, the one or more processors are configured to count a number of edges for which a value of a respective segment_indicator[ ] is equal to 1.

Clause 13B. The device of any combination of clauses 9B-12B, wherein the variable is count_minus 1.

Clause 14B. The device of any combination of clauses 9B-13B, wherein the one or more processors are further configured to: determine a difference based on the variable and a syntax element; and process the point cloud data based on the difference.

Clause 15B. The device of clause 14B, wherein a value of the syntax element is indicative of a number of vertices in the cube minus 1 and the difference equals the value of the syntax element minus the total of the counting minus 1.

Clause 16B. The device of clause 14B or clause 15B, further comprising coding the difference with an Exponential-Golomb code.

Clause 17B. The device of any combination of clauses 9B-16B, further comprising: a display configured to display imagery based on the point cloud data.

Clause 18B. A non-transitory computer-readable medium storing instructions, which, when executed, cause one or more processors to: count a number of edges of a cube of point cloud data comprising a vertex; set a variable based on a total of the counting; and process point cloud data based on the variable.

Clause 19B. The non-transitory computer-readable medium of clause 18B, wherein the variable comprises the total of the counting minus 1.

Clause 20B. A device for processing point cloud data, the device comprising: means for counting a number of edges of a cube of the point cloud data comprising a vertex; means for setting a variable based on a total of the counting; and means for processing the point cloud data based on the variable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing point cloud data, the method comprising:
    counting a number of edges of a cube of the point cloud data that comprise a respective vertex, wherein counting the number of edges of the cube of the point cloud data that comprise the respective vertex comprises counting a number of respective first syntax elements whose respective values indicate that a respective edge of the cube of the point cloud data includes a respective vertex;
    setting a variable based on a total of the counting; and
    processing the point cloud data based on the variable.

2. The method of claim 1, wherein the variable comprises the total of the counting minus 1.

3. The method of claim 1, wherein each of the respective first syntax elements comprises a segment indicator syntax element and the respective values that indicate that a respective edge of the cube of the point cloud data includes a respective vertex are equal to 1.

4. The method of claim 1, wherein the variable is count_ minus 1.

5. The method of claim 1, further comprising:
    determining a difference based on the variable and a second syntax element; and
    processing the point cloud data based on the difference.

6. The method of claim 5, wherein a value of the second syntax element is indicative of a number of vertices in the cube minus 1 and the difference equals the value of the second syntax element minus the total of the counting minus 1.

7. The method of claim 5, further comprising coding the difference with an Exponential-Golomb code.

8. A device for processing point cloud data, the device comprising:
    a memory configured to store the point cloud data; and
    one or more processors implemented in circuitry and coupled to the memory, the one or more processors being configured to:
        count a number of edges of a cube of the point cloud data that comprise a respective vertex, wherein as part of counting the number of edges of the cube of the point cloud data that comprise a respective vertex, the one or more processors are configured to count a number of respective first syntax elements whose respective values indicate that a respective edge of the cube of the point cloud data includes a respective vertex;
        set a variable based on a total of the counting; and
        process the point cloud data based on the variable.

9. The device of claim 8, wherein the variable comprises the total of the counting minus 1.

10. The device of claim 8, wherein each of the respective first syntax elements comprises a segment indicator syntax element and the respective values that indicate that a respective edge of the cube of the point cloud data includes a respective vertex are equal to 1.

11. The device of claim 8, wherein the variable is count_ minus 1.

12. The device of claim 8, wherein the one or more processors are further configured to:
    determine a difference based on the variable and a second syntax element; and
    process the point cloud data based on the difference.

13. The device of claim 12, wherein a value of the syntax element is indicative of a number of vertices in the cube minus 1 and the difference equals the value of the second syntax element minus the total of the counting minus 1.

14. The device of claim 12, further comprising coding the difference with an Exponential-Golomb code.

15. The device of claim 8, further comprising:
a display configured to display imagery based on the point cloud data.

16. A non-transitory computer-readable medium storing instructions, which, when executed, cause one or more processors to:
count a number of edges of a cube of point cloud data that comprise a respective vertex, wherein as part of counting the number of edges of the cube of the point cloud data that comprise a respective vertex, the instructions cause the one or more processors to count a number of respective first syntax elements whose respective values indicate that a respective edge of the cube of the point cloud data includes a respective vertex;
set a variable based on a total of the counting; and
process point cloud data based on the variable.

17. The non-transitory computer-readable medium of claim 16, wherein the variable comprises the total of the counting minus 1.

18. A device for processing point cloud data, the device comprising:
means for counting a number of edges of a cube of the point cloud data that comprise a respective vertex, wherein the means for counting the number of edges of the cube of the point cloud data that comprise a respective vertex comprises means for counting a number of respective first syntax elements whose respective values indicate that a respective edge of the cube of the point cloud data includes a respective vertex;
means for setting a variable based on a total of the counting; and
means for processing the point cloud data based on the variable.

* * * * *